United States Patent
Wu et al.

(10) Patent No.: US 12,170,372 B2
(45) Date of Patent: Dec. 17, 2024

(54) NITROGEN-DOPED HOLLOW COBALTOSIC OXIDE AND PREPARATION METHOD AND USE THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Xingyu Wu, Guangdong (CN); Changdong Li, Guangdong (CN); Maohua Feng, Guangdong (CN); Dingshan Ruan, Guangdong (CN); Bin Li, Guangdong (CN); Baoye Liu, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/284,775

(22) PCT Filed: Nov. 11, 2022

(86) PCT No.: PCT/CN2022/131445
§ 371 (c)(1),
(2) Date: Sep. 28, 2023

(87) PCT Pub. No.: WO2023/168977
PCT Pub. Date: Sep. 14, 2023

(65) Prior Publication Data
US 2024/0128456 A1  Apr. 18, 2024

(30) Foreign Application Priority Data
Mar. 11, 2022 (CN) .......................... 202210241239.2

(51) Int. Cl.
*H01M 4/60* (2006.01)
*C07F 15/06* (2006.01)
*H01M 4/02* (2006.01)

(52) U.S. Cl.
CPC ............ *H01M 4/60* (2013.01); *C07F 15/065* (2013.01); *H01M 2004/021* (2013.01)

(58) Field of Classification Search
CPC .. H01M 4/60; H01M 2004/021; C07F 15/065
See application file for complete search history.

(56) References Cited

U.S. PATENT DOCUMENTS

2010/0135897 A1  6/2010  He

FOREIGN PATENT DOCUMENTS

| CN | 101434416 A | 5/2009 |
|---|---|---|
| CN | 104681823 A | 6/2015 |

(Continued)

OTHER PUBLICATIONS

International Search Report with Written Opinion of the International Searching Authority issued by the China National Intellectual Property Administration for International Patent Application No. PCT/CN2022/131445, mailed on Jan. 18, 2023, with an English translation.

(Continued)

*Primary Examiner* — Helen Oi K Conley
(74) *Attorney, Agent, or Firm* — Myers Wolin, LLC (57) ABSTRACT

The invention belongs to the technical field of material synthesis, and discloses a nitrogen-doped hollow cobaltosic oxide and a preparation method and application thereof. A chemical formula of the nitrogen-doped hollow cobaltosic oxide is $Co_3O_4$—COF-T-D@C—N; and the COF-T-D is a covalent organic framework. Due to an open hollow structure, the nitrogen-doped hollow cobaltosic oxide of the invention has a large specific surface area, thus having a large contact area with an electrolyte, which is convenient for lithium ions to transport therein. The open hollow structure also prevents a volume effect from being generated during charging and discharging, and nitrogen is introduced for doping, so that granules can be gradually activated to increase the specific surface area and active sites, a dis- (Continued)

charge (cycle) stability of the material is improved, and a rate performance of the material is improved.

20 Claims, 4 Drawing Sheets (56) References Cited

FOREIGN PATENT DOCUMENTS

| CN | 107017404 A | 8/2017 |
|---|---|---|
| CN | 109616333 A | 4/2019 |
| CN | 114772653 A | 7/2022 |
| CN | 114772653 B | 6/2023 |

OTHER PUBLICATIONS

First Office Action with search report issued by the China National Intellectual Property Administration for Chinese Patent Application No. 202210241239.2, dated Feb. 10, 2023, with an English translation.

Tian et al., "Hollow cobalt oxide nanoparticles embedded in nitrogen-doped carbon nanosheets as an efficient bifunctional catalyst for Zn-air battery", Journal of Energy Chemistry, (2018), pp. 1-24, doi: https://doi.org/10.1016/j.iechem.2018.08.007.

Hu et al., "N-doped Co3O4 catalyst with a high efficiency for the catalytic decomposition of N2O", Molecular Catalysis 509 (2021) 111656, Elsevier B.V., https://doi.org/10.1016/j.mcat.2021.111656.

Notification to Grant Patent Right to Invention issued by the China National Intellectual Property Administration for Chinese Patent Application No. 202210241239.2, dated Mar. 19, 2023, with an English translation.

NITROGEN-DOPED HOLLOW COBALTOSIC OXIDE AND PREPARATION METHOD AND USE THEREOF

CROSS-REFERENCE TO RELATED APPLICATIONS

The present application is a national phase entry under 35 USC § 371 of International Application PCT/CN2022/131445, filed Nov. 11, 2022, which claims the benefit of and priority to Chinese Patent Application No. 202210241239.2, filed Mar. 11, 2022, the entire disclosures of which are incorporated herein by reference.

TECHNICAL FIELD

The invention belongs to the technical field of material synthesis, and particularly relates to a nitrogen-doped hollow cobaltosic oxide and a preparation method and use thereof.

BACKGROUND

Cobaltosic oxide belongs to a typical oxide in transition metals, which has the advantages of abundant resources, high energy storage efficiency, good catalytic activity and environmental friendliness. Nanoscale cobaltosic oxide may be widely used in lithium ion batteries, capacitors, magnetic materials, catalysts, gas sensors, stains, pressure-sensitive ceramic materials and other fields. Therefore, to prepare a $Co_3O_4$ material with uniform morphology, superior performance and outstanding characteristic has become a research hotspot all over the world, and has great research and application potentials.

The cobaltosic oxide is a translational material, with a theoretical capacity of 890 mAh/g, but generates a volume effect during charging and discharging, so that the product structure is easy to collapse, thus leading to poor cycle stability and rate performance of the product, and restricting further commercial application of the product.

SUMMARY

The invention aims at solving at least one of the above-mentioned technical problems in the prior art. Therefore, the invention provides a nitrogen-doped hollow cobaltosic oxide, and a preparation method and use thereof. The nitrogen-doped hollow cobaltosic oxide has high material discharge (cycle) stability and rate performance.

In order to achieve the above object, the invention adopts the following technical solutions.

A nitrogen-doped hollow cobaltosic oxide has a chemical formula of $Co_3O_4$—COF-T-D@C—N; and the COF-T-D is a covalent organic framework.

Preferably, the nitrogen-doped hollow cobaltosic oxide has a specific surface area of 320 m$^2$/g to 346 m$^2$/g; and the nitrogen-doped hollow cobaltosic oxide has a D50 of 80 nm to 150 nm.

Preferably, a carbon nitrogen ratio in the nitrogen-doped hollow cobaltosic oxide is (80 to 150):(0.1 to 5).

A preparation method of a nitrogen-doped hollow cobaltosic oxide comprises the following steps of:
(1) mixing adamantane containing an amino group, naphthalene containing an aldehyde group and a hydroxyl group, and a cosolvent, adding an acidizing fluid for acidification, and heating for reaction to obtain a first solid COF-T-D;
(2) adding an organic solvent and a cobalt salt into the first solid COF-T-D for mixing and stirring, reacting, carrying out solid-liquid separation, and taking a solid phase to obtain a second solid Co—COF-T-D; and
(3) washing the second solid Co—COF-T-D, adding nitrogen, performing heat treatment, cooling, and adding oxygen for oxidization to obtain the nitrogen-doped hollow cobaltosic oxide $Co_3O_4$—COF-T-D@C—N.

Preferably, in step (1), the adamantane containing the amino group is 1,3,5,7-tetraaminoadamantane; and the naphthalene containing the aldehyde group and the hydroxyl group is 2,6-dialdehyde-1,5-dihydroxynaphthalene.

Further preferably, a molar ratio of the 1,3,5,7-tetraaminoadamantane to the 2,6-dialdehyde-1,5-dihydroxynaphthalene is 1:(1.2 to 3).

Preferably, in step (1), the cosolvent is triethanolamine.

Preferably, in step (1), an addition amount of the cosolvent is 0.15 to 0.4 of a total amount of the adamantane containing the amino group and the naphthalene containing the aldehyde groups and the hydroxyl group.

Preferably, in step (1), the acidizing fluid is acetic acid.

Further preferably, a mass fraction of the acetic acid is 5 wt % to 45 wt %.

Preferably, in step (1), an addition amount of the acidizing fluid is 0.075 to 0.2 of a total amount of the adamantane containing the amino group and the naphthalene containing the aldehyde groups and the hydroxyl group.

Preferably, in step (1), the heating for reaction is performed at a temperature of 100° C. to 200° C., and a reaction time of the heating is 8 hours to 24 hours.

Figure 5:
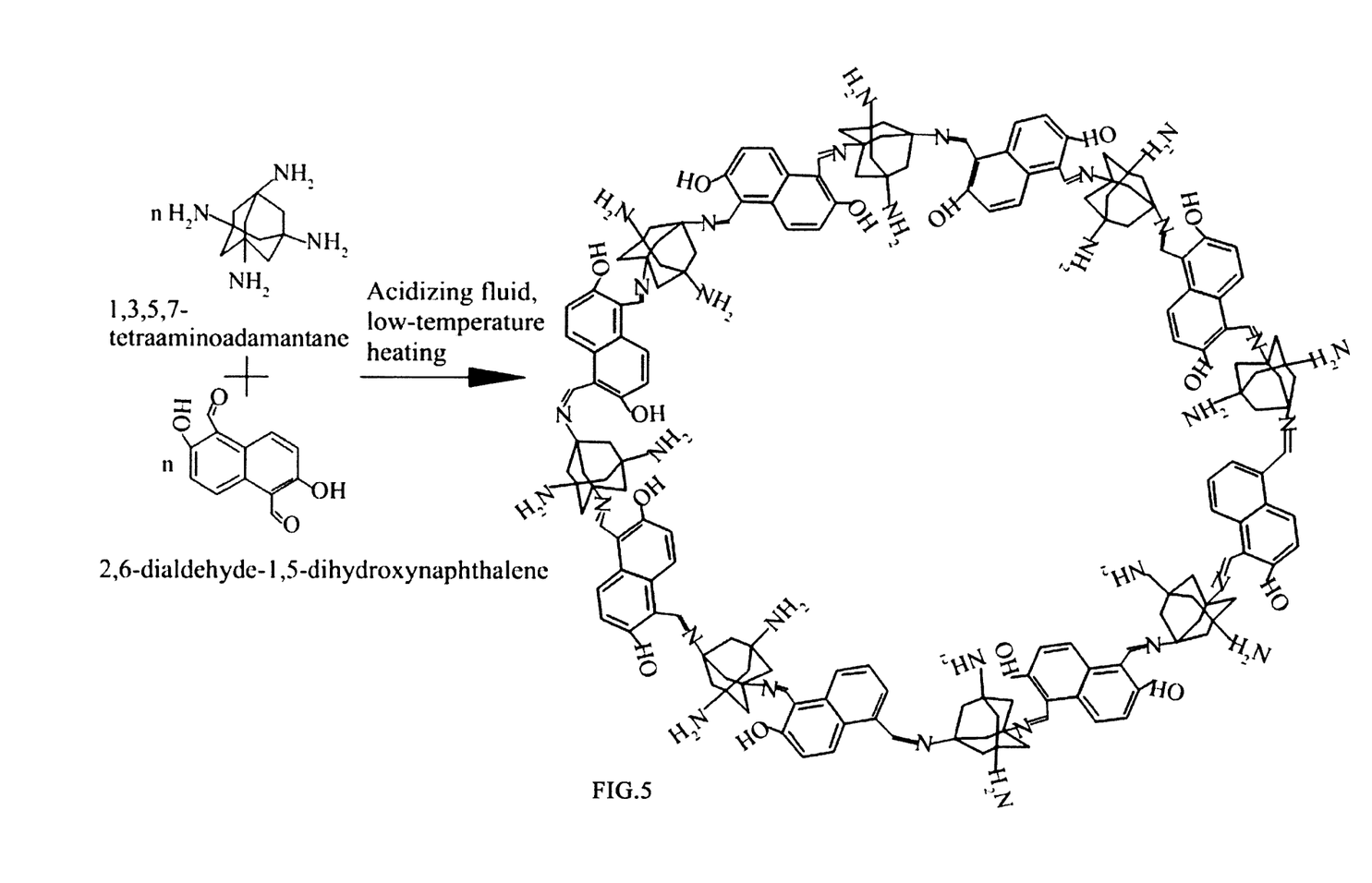
FIG. 5 is a graph showing the reaction principle of the heating for reaction in step (1) of the preparation method of a nitrogen-doped hollow cobaltosic oxide.

Preferably, in step (1), a reaction principle of the heating for reaction is shown in FIG. 5 (dehydration to generate a carbon-nitrogen double bond).

Preferably, in step (2), the organic solvent is one of methanol, ethanol and propanol.

Preferably, in step (2), the cobalt salt is at least one of cobalt sulfate, cobalt nitrate, cobalt chloride and cobalt bromide.

Preferably, in step (2), before adding the organic solvent and the cobalt salt into the first solid COF-T-D for mixing and stirring, the method further comprises the step of: washing the first solid COF-T-D, and a solvent used in the washing is acetone.

Further preferably, a liquid-solid ratio of the acetone to the first solid COF-T-D is (0.2 to 0.6) ml:1 g.

Preferably, in step (2), a solid-liquid-solid ratio of the first solid COF-T-D to the organic solvent and the cobalt salt is (10 to 20) g:(20 to 40) mL:(0.1 to 0.3) g.

Figure 6:
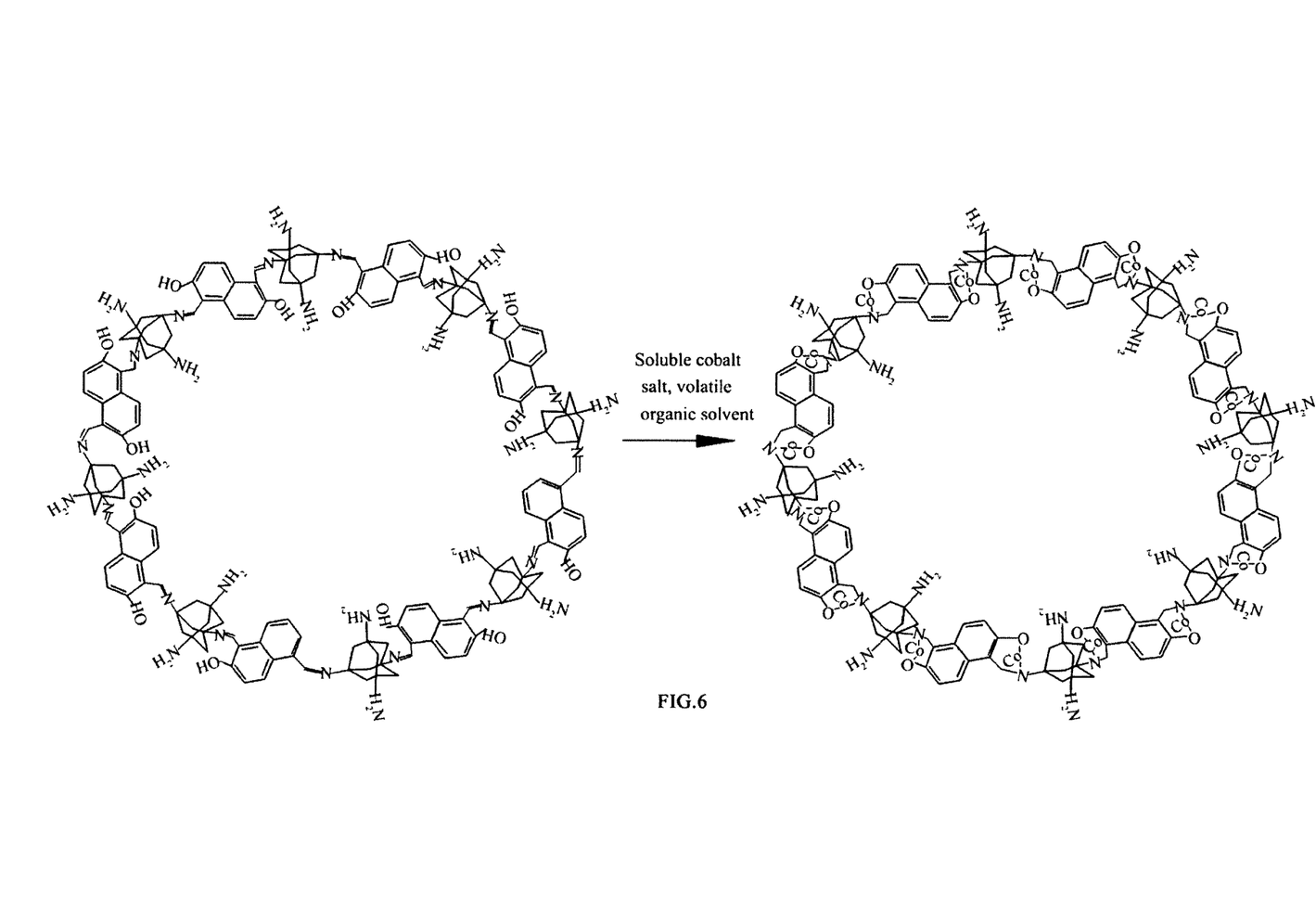
FIG. 6 is a graph showing the reaction principle of preparing the second solid Co—COF-T-D by the first solid COF-T-D in step (2) of the preparation method of a nitrogen-doped hollow cobaltosic oxide.

Preferably, in step (2), a reaction principle of preparing the second solid Co—COF-T-D by the first solid COF-T-D is shown in FIG. 6: (a hydroxyl group and a carbon-nitrogen double bond are combined with cobalt to fix cobalt ions).

The main changes above are as follows: under the condition of the organic solvent and the cobalt salt, the carbon-nitrogen double bond and the hydroxyl group in the first solid COF-T-D are combined with the cobalt to fix the cobalt ions on the first solid COF-T-D to generate the second solid Co—COF-T-D.

Preferably, in step (3), before the adding nitrogen and performing heat treatment, the method further comprises the step of evaporating the washed second solid Co—COF-T-D at a temperature of 60° C. to 100° C.

Preferably, in step (3), the heat treatment is performed at a temperature of 500° C. to 800° C., and the heat treatment lasts for 1 hours to 6 hours.

Preferably, in step (3), the heat treatment is performed in an atmosphere of nitrogen gas.

Preferably, in step (3), the adding nitrogen is to add nitrogen gas.

Preferably, in step (3), the cooling is to reduce the temperature to 200° C. to 400° C.

Preferably, in step (3), the adding oxygen for oxidization lasts for 1 hour to 2 hours.

The invention also provides a use of the nitrogen-doped hollow cobaltosic oxide in preparing a lithium ion battery, a capacitor, a magnetic material, a catalyst, a gas sensor, a stain or a pressure-sensitive ceramic material.

Compared with the prior art, the invention has the following beneficial effects.

(1) Due to an open hollow structure, the nitrogen-doped hollow cobaltosic oxide ($Co_3O_4$—COF-T-D@C—N) of the invention has a large specific surface area, thus having a large contact area with an electrolyte, which is convenient for lithium ions to transport therein, the open hollow structure also prevents a volume effect from being generated during charging and discharging, and nitrogen is introduced for doping, so that granules can be gradually activated to increase the specific surface area and active sites, a discharge (cycle) stability of the product containing the nitrogen-doped hollow cobaltosic oxide is improved, and a rate performance of the product is improved.

(2) In the invention, a COF material is obtained by dehydration condensation of the adamantane containing the amino group and the naphthalene containing the aldehyde groups and the hydroxyl group first, then the Co—COF-T-D is obtained by combining cobalt ions, and finally, the $Co_3O_4$—COF-T-D@C—N composite material is obtained by introducing nitrogen for doping. The $Co_3O_4$—COF-T-D@C—N composite has unique layered pores in the hollow structure thereof, which can give the material excellent specific capacity and stability.

DETAILED DESCRIPTION

The concepts and the technical effects produced of the invention will be clearly and completely described in conjunction with the examples and the accompanying drawings so as to sufficiently understand the objects, the features and the effects of the invention. Obviously, the described examples are merely some examples of the invention, rather than all the examples. Other examples obtained by those skilled in the art without going through any creative effort shall all fall within the protection scope of the invention.

Example 1

A preparation method of a nitrogen-doped hollow cobaltosic oxide of this example comprised the following steps of:

(1) placing 0.05 mol of 1,3,5,7-tetraaminoadamantane (TTDA) and 0.06 mol of 2,6-dialdehyde-1,5-dihydroxynaphthalene (DHDA) into an ultrasonic container for mixing, and then adding 4 mL of cosolvent triethanolamine for ultrasonic mixing for 10 minutes to obtain a first mixed solution;

(2) adding 2 mL of 16.4 wt % acetic acid into the first mixed solution for acidification, and conveying the mixture to a pressure-resistant reaction vessel at 105° C. for heating for 24 hours to obtain 13.4 g of a first solid COF-T-D;

(3) adding 3 g of acetone into the first solid COF-T-D each time for washing for five times, after washing, evenly distributing the first solid COF-T-D in 30 mL of ethanol and adding 3 mL of 0.72 mol/L cobalt sulfate solution for evenly mixing and standing, and then performing solid-liquid separation and taking a solid phase to obtain a second solid CO—COF-T-D; and (4) washing the second solid Co—COF-T-D with 20 mL of ethanol for five times, conveying the mixture to a heating furnace for heating at 100° C. to remove the liquid, then warming up to 550° C. and adding nitrogen gas and treating for 3 hours and 40 minutes, then cooling to 330° C. at a rate of 10° C./min to 15° C./min and adding oxygen for oxidization for 1 hour and 13 minutes to obtain the nitrogen-doped hollow cobaltosic oxide ($Co_3O_4$—COF-T-D@C—N).

Figure 1:
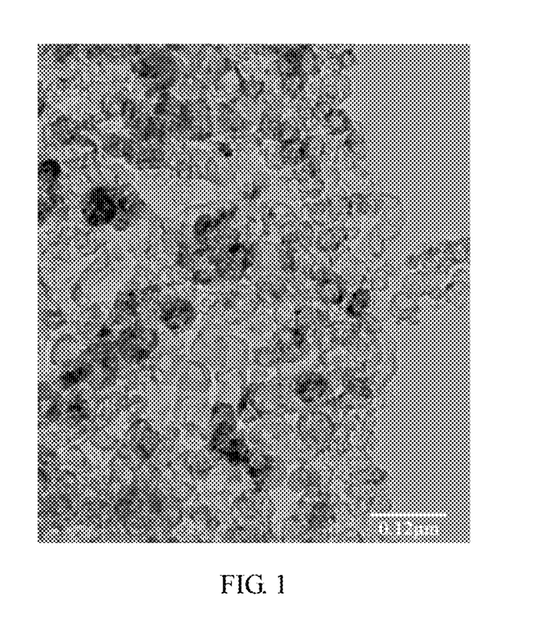
FIG. 1 is a TEM graph of a nitrogen-doped hollow cobaltosic oxide prepared in Example 1 of the invention.

FIG. 1 is a TEM graph of the nitrogen-doped hollow cobaltosic oxide prepared in Example 1 of the invention. It can be seen from FIG. 1 that a size of the prepared nitrogen-doped hollow cobaltosic oxide ranges from 1 μm to 2 μm, and most nitrogen-doped hollow cobaltosic oxide granules have a hollow structure in middle and a carbon layer outside.

Figure 2:
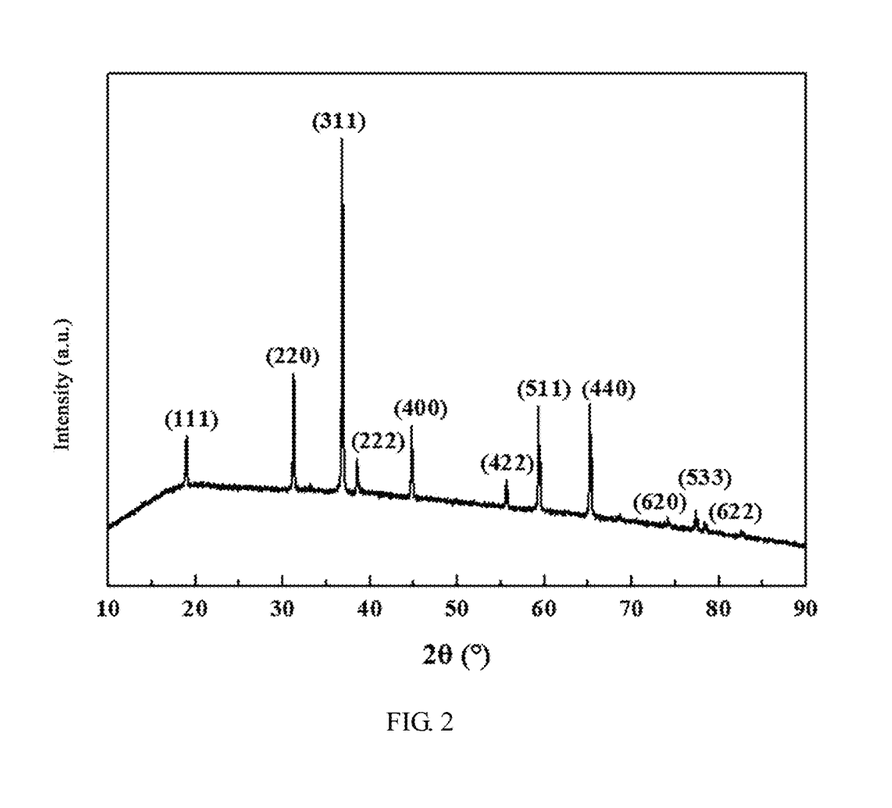
FIG. 2 is an XRD graph of the nitrogen-doped hollow cobaltosic oxide prepared in Example 1 of the invention.

FIG. 2 is an XRD graph of the nitrogen-doped hollow cobaltosic oxide prepared in Example 1 of the invention. It can be seen from FIG. 2 that a prepared sample is cobaltosic oxide by comparing a standard card of the cobaltosic oxide in combination with a position of a diffraction peak.

Figure 3:
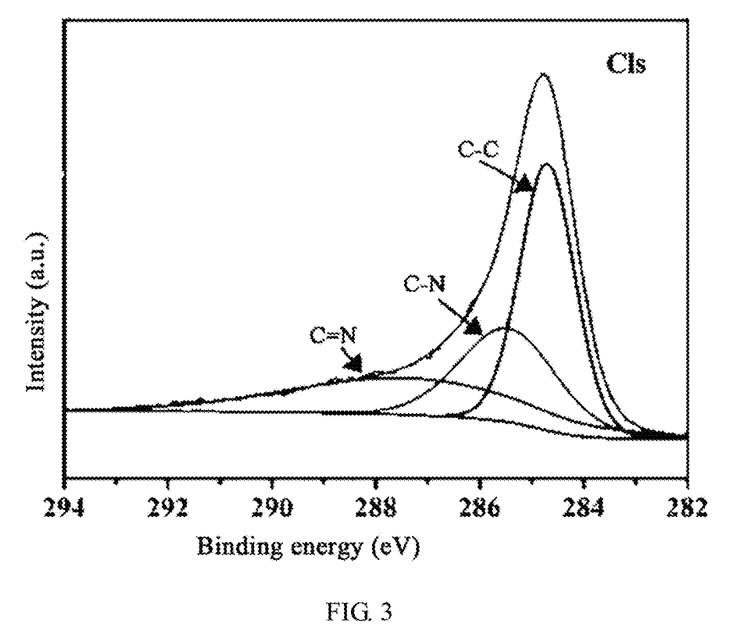
FIG. 3 is an XPS graph of the nitrogen-doped hollow cobaltosic oxide prepared in Example 1 of the invention.

FIG. 3 is an XPS graph of the nitrogen-doped hollow cobaltosic oxide prepared in Example 1 of the invention. It can be seen from FIG. 3 that after fitting, 287.9 eV and 285.4 cV have C=N and C—N covalent bonds respectively, and 284.8 eV has C—C covalent bonds, which indicates that nitrogen is coexisting with C=N and C—N covalent bonds after doping nitrogen.

Example 2

A preparation method of a nitrogen-doped hollow cobaltosic oxide of this example comprised the following steps of:

(1) placing 0.05 mol of 1,3,5,7-tetraaminoadamantane (TTDA) and 0.08 mol of 2,6-dialdehyde-1,5-dihydroxynaphthalene (DHDA) into an ultrasonic container for mixing, and then adding 5 mL of cosolvent triethanolamine for ultrasonic mixing for 10 minutes to obtain a first mixed solution;

(2) adding 3 mL of 16.4 wt % acetic acid into the first mixed solution for acidification, and conveying the mixture to a pressure-resistant reaction vessel at 145° C. for heating for 18 hours to obtain 14.6 g of a first solid COF-T-D;

(3) adding 4 g of acetone into the first solid COF-T-D each time for washing for four times, after washing, evenly distributing the first solid COF-T-D in 30 mL of ethanol and adding 3.5 mL of 0.72 mol/L cobalt sulfate solution for evenly mixing and standing, and then performing solid-liquid separation and taking a solid phase to obtain a second solid CO—COF-T-D; and (4) washing the second solid Co—COF-T-D with 25 mL of ethanol for four times, conveying the mixture to a heating furnace for heating 100° C. to remove the liquid, then warming up to 560° C. and adding nitrogen gas and treating for 3 hours and 40 minutes, then cooling to 330° C. at a rate of 10° C./min to 15° C./min and adding oxygen for oxidization for 1 hour and 13 minutes to obtain the nitrogen-doped hollow cobaltosic oxide ($Co_3O_4$—COF-T-D@C—N).

Example 3

A preparation method of a nitrogen-doped hollow cobaltosic oxide of this example comprised the following steps of:

(1) placing 0.05 mol of 1,3,5,7-tetraaminoadamantane (TTDA) and 0.06 mol of 2,6-dialdehyde-1,5-dihydroxynaphthalene (DHDA) into an ultrasonic container for mixing, and then adding 4 mL of cosolvent triethanolamine for ultrasonic mixing for 10 minutes to obtain a first mixed solution;

(2) adding 2 mL of 33.8 wt % acetic acid into the first mixed solution for acidification, and conveying the mixture to a pressure-resistant reaction vessel at 125° C. for heating for 20 hours to obtain 13.7 g of a first solid COF-T-D;

(3) adding 4 g of acetone into the first solid COF-T-D for washing for five times, after washing, evenly distributing the first solid COF-T-D in 35 mL of ethanol and adding 4 mL of 0.79 mol/L cobalt sulfate solution for evenly mixing and standing, and then performing solid-liquid separation and taking a solid phase to obtain a second solid CO—COF-T-D; and:

(4) washing the second solid Co—COF-T-D with 30 mL of ethanol for five times, conveying the mixture to a heating furnace for heating 100° C. to remove the liquid, then warming up to 630° C. and adding nitrogen gas and treating for 2 hours and 10 minutes, then cooling to 220° C. at a rate of 10° C./min to 15° C./min and adding oxygen for oxidization for 1 hour and 57 minutes to obtain the nitrogen-doped hollow cobaltosic oxide ($Co_3O_4$—COF-T-D@C—N).

Example 4

A preparation method of a nitrogen-doped hollow cobaltosic oxide of this example comprised the following steps of:

(1) placing 0.05 mol of 1,3,5,7-tetraaminoadamantane (TTDA) and 0.12 mol of 2,6-dialdehyde-1,5-dihydroxynaphthalene (DHDA) into an ultrasonic container for mixing, and then adding 4 mL of cosolvent triethanolamine for ultrasonic mixing for 10 minutes to obtain a first mixed solution;

(2) adding 2 mL of 16.4 wt % acetic acid into the first mixed solution for acidification, and conveying the mixture to a pressure-resistant reaction vessel at 189° C. for heating for 10 hours to obtain 15.3 g of a first solid COF-T-D;

(3) adding 5 g of acetone into the first solid COF-T-D each time for washing for five times, after washing, evenly distributing the first solid COF-T-D in 30 mL of ethanol and adding 3.5 mL of 0.79 mol/L cobalt sulfate solution for evenly mixing and standing, and then performing solid-liquid separation and taking a solid phase to obtain a second solid CO—COF-T-D; and (4) washing the second solid Co—COF-T-D with 20 mL of ethanol for four times, conveying the mixture to a heating furnace for heating 100° C. to remove the liquid, then warming up to 754° C. and adding nitrogen gas and treating for 3 hours and 40 minutes, then cooling to 257° C. at a rate of 10° C./min to 15° C./min and adding oxygen for oxidization for 1 hour and 13 minutes to obtain the nitrogen-doped hollow cobaltosic oxide ($Co_3O_4$—COF-T-D@C—N).

Figure 4:
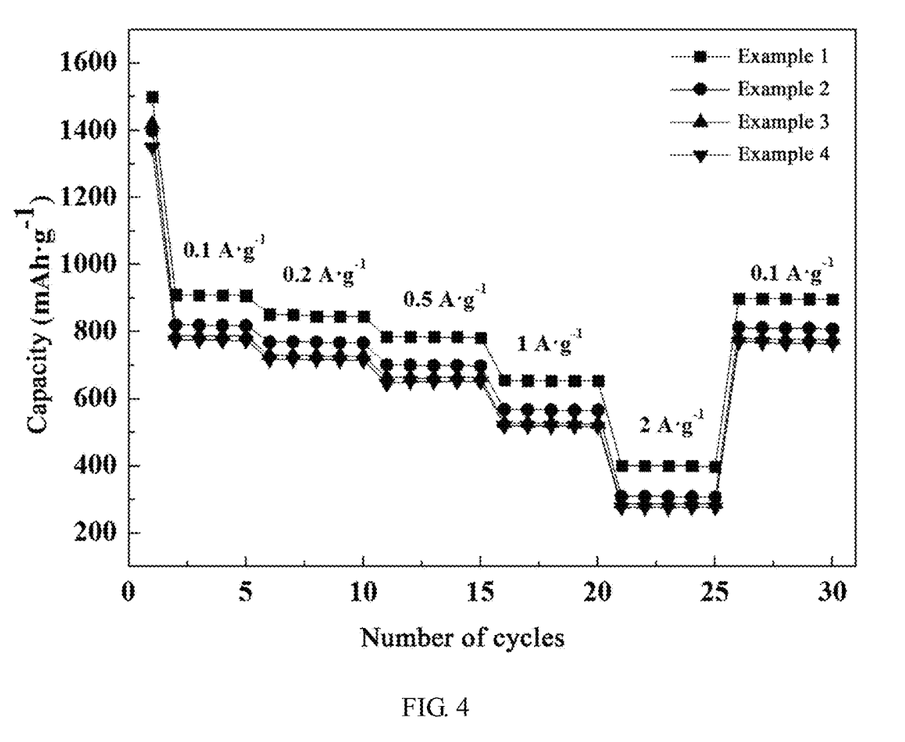
FIG. 4 is a chart showing rate performances of the nitrogen-doped hollow cobaltosic oxide prepared by Examples 1 to 4 of the invention.

Preparation of Button Battery:

$Co_3O_4$—COF-T-D@C—N(prepared in Examples 1 to 4) was used as a cathode material, and a lithium sheet was used as an anode to assembly CR2025 button batteries, and electrochemical performances of the batteries were tested at current densities of 0.1 A/g, 0.2 A/g, 0.5 A/g, 1 A/g and 2 A/g and voltages of 0.01 V to 3 V. With a mass ratio of 8:1:1, an electrode composite material, an adhesive polyvinylidene fluoride and acetylene black were mixed in N-methyl pyrrolidone (NMP), coated on an aluminum foil, dried in a vacuum drying oven at 60° C., sliced, and then assembled into half batteries in a glove box with inert gas. The electrolyte was $LiPF_6$/EC (ethylene carbonate)+DEC (dimethyl carbonate)+EMC (methyl ethyl carbonate), and the compositions of the electrolyte were EC, DMC and EMC in the mass ratio of 1:1:1. The results are as shown in FIG. 4. FIG. 4 is a rate performance chart showing rate performances of the nitrogen-doped hollow cobaltosic oxide prepared by Examples 1 to 4 of the invention. It can be seen from FIG. 4 that under the current density of 0.1 A/g, the first specific charge-discharge capacity of the nitrogen-doped hollow cobaltosic oxide prepared by the invention is greater than 1,550 mAh/g, which is far larger than the theoretical capacity of the cobaltosic oxide of 890 mAh/g, and the rate performance is good.

TABLE 1

Specific surface areas of nitrogen-doped hollow cobaltosic oxides prepared in Examples 1 to 4

|  | Example 1 | Example 2 | Example 3 | Example 4 |
|---|---|---|---|---|
| BET ($m^2$/g) | 344.3 | 329.2 | 321.6 | 320.7 |

It can be seen from FIG. 4 and Table 1 that Example 1 has a high specific surface area, and the specific discharge capacity at different rates is higher than that of Examples 2, 3 and 4. And the specific surface areas of the nitrogen-doped hollow cobaltosic oxides prepared in Examples 2 to 4 are also excellent, which can meet battery performance requirements.

The invention is not limited to the above examples, and various changes can be made within the knowledge of those of ordinary skills in the art without departing from the objective of the invention. In addition, in case of no conflict, the examples in the invention and the features in the examples may be combined with each other.

The invention claimed is:

1. A hollow cobaltosic oxide carbon-nitrogen composite, wherein a chemical formula of the hollow cobaltosic oxide carbon-nitrogen composite is $Co_3O_4$—COF-T-D@C—N; wherein, COF-T-D is a covalent organic framework, T is 1,3,5,7-tetraaminoadamantane; D is 2,6-dialdehyde-1,5-dihydroxynaphthalene "—" means bonding, and "@" means doping; and the hollow cobaltosic oxide carbon-nitrogen composite is prepared by a method comprising the following steps of:
(1) mixing 1,3,5,7-tetraaminoadamantane, 2,6-dialdehyde-1,5-dihydroxynaphthalene, and a cosolvent, adding an acidizing fluid for acidification, and heating for reaction to obtain a first solid COF-T-D, wherein a molar ratio of the 1,3,5,7-tetraaminoadamantane to the 2,6-dialdehyde-1,5-dihydroxynaphthalene is 1:(1.2 to 3);
(2) adding an organic solvent and a cobalt salt into the first solid COF-T-D for mixing and stirring, reacting, carrying out solid-liquid separation, and taking a solid phase to obtain a second solid Co—COF-T-D, wherein a solid-liquid-solid ratio of the first solid COF-T-D to the organic solvent and the cobalt salt is (10 to 20) g:(20 to 40) mL:(0.1 to 0.3) g; and
(3) washing the second solid Co—COF-T-D, adding nitrogen, performing heat treatment, cooling, and adding oxygen for oxidization to obtain the hollow cobaltosic oxide carbon-nitrogen composite $Co_3O_4$—COF-T-D@C—N.

2. The hollow cobaltosic oxide carbon-nitrogen composite according to claim 1, wherein the hollow cobaltosic oxide carbon-nitrogen composite has a specific surface area of 320 $m^2/g$ to 346 $m^2/g$; and the hollow cobaltosic oxide carbon-nitrogen composite has a D50 of 80 nm to 150 nm.

3. The hollow cobaltosic oxide carbon-nitrogen composite according to claim 1, wherein a carbon-nitrogen ratio in the hollow cobaltosic oxide carbon-nitrogen composite is (80 to 150):(0.1 to 5).

4. A preparation method of the hollow cobaltosic oxide carbon-nitrogen composite according to claim 1, comprising the following steps of:
(1) mixing adamantane containing an amino group, naphthalene containing an aldehyde group and a hydroxyl group, and a cosolvent, adding an acidizing fluid for acidification, and heating for reaction to obtain a first solid COF-T-D;
(2) adding an organic solvent and a cobalt salt into the first solid COF-T-D for mixing and stirring, reacting, carrying out solid-liquid separation, and taking a solid phase to obtain a second solid Co—COF-T-D; and
(3) washing the second solid Co—COF-T-D, adding nitrogen, performing heat treatment, cooling, and adding oxygen for oxidization to obtain the hollow cobaltosic oxide carbon-nitrogen composite $Co_3O_4$—COF-T-D@C—N; wherein,
in step (1), the adamantane containing the amino group is 1,3,5,7-tetraaminoadamantane; the naphthalene containing the aldehyde group and the hydroxyl group is 2,6-dialdehyde-1,5-dihydroxynaphthalene, and a molar ratio of the 1,3,5,7-tetraaminoadamantane to the 2,6-dialdehyde-1,5-dihydroxynaphthalene is 1:(1.2 to 3), and
in step (2), a solid-liquid-solid ratio of the first solid COF-T-D to the organic solvent and the cobalt salt is (10 to 20) g:(20 to 40) mL:(0.1 to 0.3) g.

5. The preparation method according to claim 4, wherein in step (1), the cosolvent is triethanolamine; and the acidizing fluid is acetic acid.

6. The preparation method according to claim 4, wherein in step (2), the organic solvent is one of methanol, ethanol and propanol.

7. The preparation method according to claim 4, wherein in step (2), the cobalt salt is at least one of cobalt sulfate, cobalt nitrate, cobalt chloride and cobalt bromide.

8. The preparation method according to claim 4, wherein in step (2), before adding the organic solvent and the cobalt salt into the first solid COF-T-D for mixing and stirring, the method further comprises the step of: washing the first solid COF-T-D, wherein a solvent used in the washing is acetone.

9. The preparation method according to claim 4, wherein in step (3), the heat treatment is performed at a temperature of 500° C. to 800° C., and the heat treatment lasts for 1 hour to 6 hours.

10. A preparation method of the hollow cobaltosic oxide carbon-nitrogen composite according to claim 2, comprising the following steps of:
(1) mixing adamantane containing an amino group, naphthalene containing an aldehyde group and a hydroxyl group, and a cosolvent, adding an acidizing fluid for acidification, and heating for reaction to obtain a first solid COF-T-D;
(2) adding an organic solvent and a cobalt salt into the first solid COF-T-D for mixing and stirring, reacting, carrying out solid-liquid separation, and taking a solid phase to obtain a second solid Co—COF-T-D; and
(3) washing the second solid Co—COF-T-D, adding nitrogen, performing heat treatment, cooling, and adding oxygen for oxidization to obtain the hollow cobaltosic oxide carbon-nitrogen composite $Co_3O_4$—COF-T-D@C—N; wherein,
in step (1), the adamantane containing the amino group is 1,3,5,7-tetraaminoadamantane; the naphthalene containing the aldehyde group and the hydroxyl group is 2,6-dialdehyde-1,5-dihydroxynaphthalene, and a molar ratio of the 1,3,5,7-tetraaminoadamantane to the 2,6-dialdehyde-1,5-dihydroxynaphthalene is 1:(1.2 to 3), and
in step (2), a solid-liquid-solid ratio of the first solid COF-T-D to the organic solvent and the cobalt salt is (10 to 20) g:(20 to 40) mL:(0.1 to 0.3) g.

11. The preparation method according to claim 10, wherein in step (1), the cosolvent is triethanolamine; and the acidizing fluid is acetic acid.

12. The preparation method according to claim 10, wherein in step (2), the organic solvent is one of methanol, ethanol and propanol.

13. The preparation method according to claim 10, wherein in step (2), the cobalt salt is at least one of cobalt sulfate, cobalt nitrate, cobalt chloride and cobalt bromide.

14. The preparation method according to claim 10, wherein in step (2), before adding the organic solvent and the cobalt salt into the first solid COF-T-D for mixing and stirring, the method further comprises the step of: washing the first solid COF-T-D, wherein a solvent used in the washing is acetone.

15. The preparation method according to claim 10, wherein in step (3), the heat treatment is performed at a temperature of 500° C. to 800° C., and the heat treatment lasts for 1 hour to 6 hours.

16. A preparation method of the hollow cobaltosic oxide carbon-nitrogen composite according to claim 3, comprising the following steps of:

(1) mixing adamantane containing an amino group, naphthalene containing an aldehyde group and a hydroxyl group, and a cosolvent, adding an acidizing fluid for acidification, and heating for reaction to obtain a first solid COF-T-D;
(2) adding an organic solvent and a cobalt salt into the first solid COF-T-D for mixing and stirring, reacting, carrying out solid-liquid separation, and taking a solid phase to obtain a second solid Co—COF-T-D; and
(3) washing the second solid Co—COF-T-D, adding nitrogen, performing heat treatment, cooling, and adding oxygen for oxidization to obtain the hollow cobaltosic oxide carbon-nitrogen composite $Co_3O_4$—COF-T-D@C—N; wherein, in step (1), the adamantane containing the amino group is 1,3,5,7-tetraaminoadamantane; the naphthalene containing the aldehyde group and the hydroxyl group is 2,6-dialdehyde-1,5-dihydroxynaphthalene, and a molar ratio of the 1,3,5,7-tetraaminoadamantane to the 2,6-dialdehyde-1,5-dihydroxynaphthalene is 1:(1.2 to 3), and in step (2), a solid-liquid-solid ratio of the first solid COF-T-D to the organic solvent and the cobalt salt is (10 to 20) g:(20 to 40) mL:(0.1 to 0.3) g.

17. The preparation method according to claim 16, wherein in step (1), the cosolvent is triethanolamine; and the acidizing fluid is acetic acid.

18. The preparation method according to claim 16, wherein in step (2), the organic solvent is one of methanol, ethanol and propanol.

19. The preparation method according to claim 16, wherein in step (2), the cobalt salt is at least one of cobalt sulfate, cobalt nitrate, cobalt chloride and cobalt bromide.

20. The preparation method according to claim 16, wherein in step (2), before adding the organic solvent and the cobalt salt into the first solid COF-T-D for mixing and stirring, the method further comprises the step of: washing the first solid COF-T-D, wherein a solvent used in the washing is acetone.

\* \* \* \* \*